United States Patent [19]

Wolfe

[11] Patent Number: 5,758,451
[45] Date of Patent: Jun. 2, 1998

[54] FISHING BOBBER OF TWO PART CONSTRUCTION

[76] Inventor: Thomas James Wolfe, Box 84, Nicktown, Pa. 15762

[21] Appl. No.: 352,502
[22] Filed: Dec. 9, 1994
[51] Int. Cl.⁶ .................................................. A01K 93/00
[52] U.S. Cl. ........................ 43/44.91; 43/44.88; 43/44.9
[58] Field of Search ........................ 43/43.15, 44.87, 43/44.88, 44.9, 44.91

[56] References Cited

U.S. PATENT DOCUMENTS

| | | | |
|---|---|---|---|
| 2,274,380 | 2/1942 | Pool | 43/44.88 |
| 2,379,676 | 7/1945 | Blackstone | 43/44.88 |
| 2,741,864 | 4/1956 | Shotton | 43/44.9 |
| 2,825,175 | 3/1958 | Skvier | 43/44.91 |
| 3,624,949 | 12/1971 | Lowndes | 43/44.91 |
| 3,800,461 | 4/1974 | Jacobi | 43/44.88 |
| 4,359,836 | 11/1982 | Yuji | 43/44.87 |

*Primary Examiner*—Kurt Rowan
*Attorney, Agent, or Firm*—John P. Halvonik

[57] ABSTRACT

An improved bobber having two separate floatation units, or bobbers, is shown and its use described. The smaller of the two bobbers is fit inside an aperture in the larger. The two floats are connected to one another along the fishing line. The larger of the two is weighted in order that it floats in an upright position and keeps the smaller float inside the larger until the fish strikes. When a fish strikes bait at the end of the line, the smaller float will come out of the larger one. In the event that the fish is not hooked, the smaller float will float at the top of the water thus indicating a miss. A stop means on the line above the apparts limits the distance the smaller one can travel from the larger float after the two parts are separated.

3 Claims, 1 Drawing Sheet

FISHING BOBBER OF TWO PART CONSTRUCTION

BACKGROUND AND FIELD OF THE INVENTION

The invention relates to the field of fishing and, in particular, to the use and description of an improved bobber that will indicate to a fisherman that a hit or miss has occurred without constant visual contact of the bobber. The device has two main floatation parts, or bobbers, that are separated from one another and still connected along the fishing line when the fish strikes.

It is believed that by providing a bobber with a smaller float that can be separated from the larger float, fisherman can be provided with an early warning that a miss has occurred and that the bait may have been stripped even though the fisherman was not observing the bobber at the time of the hit and miss. The fisherman will observe the smaller float floating beside the larger float in the water beside it.

Such a bobber of two part construction has the advantages that smaller bobbers have in that they offer low resistance to fish because of their small size without suffering from the disadvantages of smaller bobbers, viz.: that they are hard to see and cannot be cast long distances. The larger portion of the device offers the advantages of larger bobbers but without the disadvantage of offering high resistance to the fish. Large bobbers do offer substantial resistance to fish because their size offers a lot of resistance to the water when the fish bites on the line. Such resistance may result in the bait coming out of the fishe's mouth and thus prevent the hooking of the fish.

These advantages are achieved because the smaller bobber becomes separated from the larger upon the strike of the fish, thus the fish is really pulling on the resistance of the second, smaller, bobber in the water and the fishing line goes right through the larger bobber. Thus, the larger bobber has no effective drag on the hooked fish but does offer the same visual advantages of large bobbers. Eventually though, the movement of the fishing line will stop due to a stop means placed on the line above the larger bobber. The bobber also offers advantages in that the hook is set automatically by the action of the line stop when the smaller bobber separates from the larger bobber.

DESCRIPTION OF THE PRIOR ART

While there are bobbers that have more than one part that floats, none that applicant is aware of have floating portions that can be separated from one another upon the striking of the bait by the fish. There are no bobbers that applicant is aware of that can indicate a miss through the action of two separate floating portions.

SUMMARY OF THE INVENTION

The invention is a fishing bobber apparatus of two part construction. A first part larger floatation portion and a second part smaller floatation portion. The larger portion has a cavity for holding the smaller float until the fish strikes the line at which time, the smaller will separate from the larger one although the two are still connected along the fishing line. In the event of a miss, the smaller float will float to the surface of the water i.e. the water line, because there will be slack in the line between the two floating portions.

In this manner, the fisherman is aware immediately upon observation that a miss has occurred and that the bait may be gone and therefore does not have to waste his time and effort fishing unknowingly with a baitless hook. A passage in the back of the cavity of the larger bobber permits the fishing line to run through the float. A stop means placed on the line above the device, preferred range 6 inches to 3 feet, limits the distance of separation of the two floats.

It is an object of the invention to provide a fishing bobber that will allow fisherman to tell at an earlier time when a fish has merely nibbled on the bait and thus provide an indicator of a missand that the bait may be gone.

Another object of the invention is to provide a fishing bobber that will set the hook in the mouth of these fish automatically.

Another object of the invention is to provide a bobber that has high visibility in the water like a larger bobber but yet does not provide a large resistance to the strike of the fish.

Another object of the invention is to provide a bobber that will be able to be cast over long distances a'la large bobbers and yet has the advantage of smaller bobbers in that they do not detract from the pulling action of the fish Other objectives of the invention will become apparent to those skilled in the art once the invention has been shown and described.

DESCRIPTION OF THE PREFERRED EMBODIMENT

Figure 1:
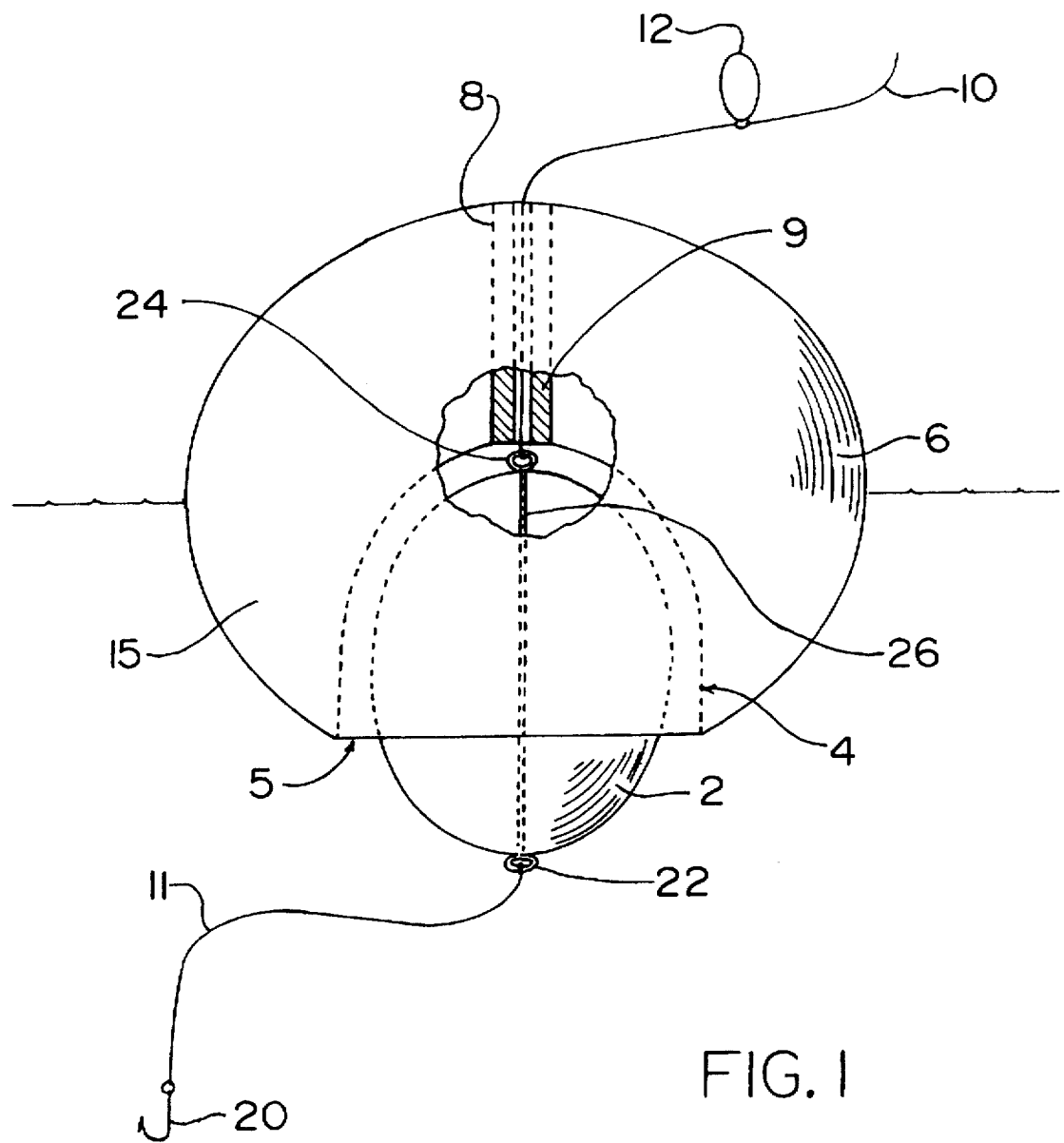
FIG. 1 Cut away view of device showing the smaller bobber inside the interior passage in the larger.

The overall construction of the two part bobber is as shown in FIG. 1 The smaller bobber 2 fits inside the cavity 4 in the larger bobber 6. The cavity should be of size able to accommodate the smaller bobber and may be said to have a relatively large entrance passage 5 able to accommodate the movement of the smaller float. The cavity also has a smaller, rear, passage 8 opposite the large entrance passage 5. This passage should be opposite the entrance passage 5 and may be much smaller in diameter than the entrance passage. The rear passage 8 need only be sized to fit a fishing line 10 that should be placed through it. This passage may be reinforced with a metal (or other material) conduit 9.

The smaller float or bobber has an eyelet 24 located at its top and another 22 at its bottom. The first fishing line 10 running through the larger bobber is attached to the top eyelet. The fishing line 11 that holds the hook/bait is attached to the bottom eyelet 22. These eyelets may be connected by a metal wire 26 running through the small bobber for further strength. The smaller bobber is spherical in shape, see FIG. 1, and is preferably about ½" to 1" in diameter.

The main line 10 should be attached to the top of the smaller float so that when the fisherman pulls back on the line (after the initial cast) the smaller bobber will be pulled back into the cavity and thus be secured in place within the cavity until the fish strikes. This connection should not be confused with the line stop 12 used on the main line above the device.

When the fish strikes, the pull on the line 11 will cause the smaller float to become separated from the larger. The smaller float may be said to become separated from the larger one with the understanding that the two are still connected through the fishing line 10. As long as the line 11 is taut, the smaller float will remain underwater beneath the larger float. In the event of a miss, (the fish expels the bait/hook) the smaller float will float free of the larger and rise to the surface of the water. The floating on the surface of the water by the small bobber will indicate a miss, i.e. the fish nibbled on the bait but is not hooked.

The line stop 12 may be of any state of the art means with split shot being one example. The line stop will prevent the small float and the larger float from becoming too far separated when the bait is pulled on. This situation would occur when, if for example: the fish pulls on the line by a strike or nibble. It should be kept in mind that there needs to be kept enough distance in the line between the line stop and the smaller float in order that the smaller one can float to the surface of the body of water free of the larger one. Also, the stop should be not be close as to cause the stop to run into the float at an early stage and thus offer resistance to the fish who is tugging on the bait.

When a fish strikes the bait at the end of the line and becomes hooked, the smaller bobber will become separated from the larger one and remain underwater-out of sight. This is due to the nature of the fish pulling on the line 11 which serves to pull the line taut and prevent the smaller float from floating at the top of the water line.

The larger float should have weights placed in the outer wall of this portion and near the bottom 15 where the entrance passage of the cavity is located. The weights should be so chosen so that the large float will float with entrance passage of the cavity face down upon the water. Each floating portion should be constructed so as to float upon water. Such construction may be of any state of the art means including but not limited to: hollow body plastic construction which is often times used in many state of the art bobbers.

I claim:

1. A fishing bobber comprising a large bobber having a cavity, a weight adjacent said cavity so that said large bobber will float with said cavity substantially under the surface of the water and a line passage extending through said large bobber and said cavity so that a first fishing line may pass through said line passage and said cavity, a small bobber attached to said first fishing line below said large bobber so that said small bobber is removably fitted into said cavity, a fish hook attached to said small bobber by a second fishing line, whereby when a fish strikes, said small bobber is pulled from said cavity and will float to the surface of the water if the fish expels the hook indicating a miss.

2. The fishing bobber of claim 1 wherein said small bobber is about ½" to about 1" in diameter.

3. The fishing bobber of claim 1 wherein said cavity has a diameter of about ¾" to about 1 and ¼".

\* \* \* \* \*